United States Patent
Choi et al.

(10) Patent No.: US 12,044,163 B1
(45) Date of Patent: Jul. 23, 2024

(54) MODELING COMPRESSOR PRESSURE DROP FOR TURBOCHARGER INCORPORATING COLD LIGHT OFF CATALYST

(71) Applicant: FCA US LLC, Auburn Hills, MI (US)

(72) Inventors: Jeongyong Choi, Rochester, MI (US); Michael Barkey, Maidstone (CA); William Attard, Brighton, MI (US); Filip Vucak, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/526,048

(22) Filed: Dec. 1, 2023

(51) Int. Cl.
*F02B 37/18* (2006.01)
*F02D 41/00* (2006.01)
*F02D 41/04* (2006.01)
*F01N 3/10* (2006.01)

(52) U.S. Cl.
CPC ........ *F02B 37/183* (2013.01); *F02D 41/0007* (2013.01); *F02D 41/04* (2013.01); *F01N 3/105* (2013.01); *F01N 2430/06* (2013.01); *F02D 2200/0402* (2013.01)

(58) Field of Classification Search
CPC .... F02B 37/183; F01N 2430/06; F01N 3/105; F02D 41/04; F02D 41/0007; F02D 2200/0402
See application file for complete search history.

(56) References Cited

U.S. PATENT DOCUMENTS

| | | | |
|---|---|---|---|
| 2011/0011082 A1* | 1/2011 | Mehta | F02B 37/18 60/299 |
| 2012/0017587 A1* | 1/2012 | Yoshida | F01N 3/101 60/602 |
| 2014/0109553 A1* | 4/2014 | Roberts, Jr. | F01N 13/0093 60/274 |
| 2017/0328263 A1* | 11/2017 | Uhrich | F02M 26/06 |
| 2020/0095913 A1* | 3/2020 | Rohde | F01N 3/208 |

FOREIGN PATENT DOCUMENTS

| | | | | |
|---|---|---|---|---|
| CN | 115467740 A | * | 12/2022 | ........ F01N 13/087 |
| DE | 102017105639 A1 | * | 9/2017 | ........ F01N 13/0097 |
| DE | 102017209743 A1 | * | 12/2018 | ........ F01N 13/0093 |

* cited by examiner

*Primary Examiner* — Ngoc T Nguyen
(74) *Attorney, Agent, or Firm* — Jeremy J. Klobucar

(57) ABSTRACT

A control system for an engine comprising a turbocharger includes a throttle valve, a cold light off catalyst (CLOC), a CLOC valve, and a controller. The CLOC is positioned in a bypass passage around a turbine of the turbocharger. The CLOC valve selectively routes exhaust flow from the engine between the turbine and the CLOC. The controller is configured to command the CLOC valve to a first position whereby exhaust flow is routed to the CLOC in a CLOC mode; determine, based on operation in the CLOC mode, a pressure drop within the turbocharger; and command the actuator to move resulting in increased airflow into the engine while in the CLOC mode.

18 Claims, 3 Drawing Sheets

MODELING COMPRESSOR PRESSURE DROP FOR TURBOCHARGER INCORPORATING COLD LIGHT OFF CATALYST

FIELD

The present application generally relates to turbochargers and, more particularly, to techniques for controlling a valve that directs exhaust flow around the turbocharger and into a cold light off catalyst.

BACKGROUND

As is known, pollutant emissions such as nitrogen oxides (NOx), carbon monoxide (CO), and hydrocarbon (HC) are temperature sensitive in aftertreatment systems. Such emission conversion begins at high temperatures such as over 350 C depending on catalyst formulation. Typically, at engine startup, idle exhaust temperatures are much below the high temperatures needed for optimal catalyst efficiencies. In particular, an amount of time is needed for the exhaust to heat up from the typical exhaust temperatures to the elevated temperatures that satisfy a desired efficiency target. Operation of the engine during this heating up time is inefficient for conversion of such pollutants. Accordingly, a need exists in the art to improve upon efficiencies of aftertreatment systems.

SUMMARY

According to one example aspect of the invention, a control system for an engine comprising a turbocharger includes a throttle valve, a cold light off catalyst (CLOC), a CLOC valve, and a controller. The CLOC is positioned in a bypass passage around a turbine of the turbocharger. The CLOC valve selectively routes exhaust flow from the engine between the turbine and the CLOC. The controller is configured to command the CLOC valve to a first position whereby exhaust flow is routed to the CLOC in a CLOC mode; determine, based on operation in the CLOC mode, a pressure drop within the turbocharger; and command the actuator to move resulting in increased airflow into the engine while in the CLOC mode.

In some implementations, commanding the CLOC valve to the first position comprises commanding the CLOC valve to a position wherein all exhaust flow is directed to the CLOC.

In other implementations, commanding the actuator comprises commanding the CLOC valve from the first position to an open position based on determining the pressure drop within the turbocharger. Determining the pressure drop within the turbocharger is indicative of a vacuum condition within the turbocharger. The open position comprises a position corresponding to less than 5% open.

In additional implementations, commanding the actuator comprises commanding the throttle valve to open a predetermined amount to allow increased airflow into the engine. The control system includes intake and exhaust valves that control airflow into and out of the engine. Commanding the actuator comprises altering the opening and closing of one of the intake and exhaust valves to allow increased airflow into the engine.

In examples, determining the pressure drop within the turbocharger comprises receiving a signal from a pressure sensor indicative of the pressure of the turbocharger.

In implementations, determining the pressure within the turbocharger comprises modeling the pressure drop of the turbocharger based on operating conditions.

According to another example aspect of the invention, a method for controlling an engine comprising a turbocharger includes commanding operation of a cold light off catalyst (CLOC) positioned in a bypass passage around a turbine of the turbocharger, the commanding including commanding a CLOC valve to a first position whereby exhaust flow is routed, at least partially, to the CLOC in a CLOC mode; determining, based on operation in the CLOC mode, a pressure drop within the turbocharger; and commanding an actuator to move resulting in increased airflow into the engine while in the CLOC mode.

In some implementations, commanding the CLOC valve to the first position includes commanding the CLOC valve to a position wherein all exhaust flow is directed to the CLOC.

In other implementations, commanding the actuator comprises commanding the CLOC valve from the first position to an open position based on determining the pressure drop within the turbocharger. Determining the pressure drop within the turbocharger is indicative of a vacuum condition within the turbocharger. In examples, the open position comprises a position corresponding to less than 5% open.

In additional implementations, commanding the actuator includes commanding the throttle valve to open a predetermined amount to allow increased airflow into the engine.

In additional implementations, the engine includes intake and exhaust valves that control airflow into and out of the engine, wherein commanding the actuator comprises altering the opening and closing of one of the intake and exhaust valves to allow increased airflow into the engine.

In additional implementations, determining the pressure drop within the turbocharger comprises receiving a signal from a pressure sensor indicative of the pressure of the turbocharger.

In additional implementations, determining the pressure within the turbocharger comprises modeling the pressure drop of the turbocharger based on operating conditions.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

The present disclosure is directed toward emission control on turbocharged engines. A system and related techniques are described for controlling a cold start light off catalyst (CLOC) where a CLOC valve is controlled to divert exhaust gas from the turbine of the turbocharger and through a small catalyst in a CLOC mode. The CLOC can achieve high efficiency quickly to treat the exhaust gas, while a much larger downstream catalyst is warming up. During full rerouting of the exhaust from the turbocharger and to the CLOC, exhaust flow is precluded from flowing through the turbine of the turbocharger. When the CLOC valve is fully closed (during CLOC mode), there exists the potential for the turbocharger shaft to spin due to the compressor side airflow requirement from the engine. Because the turbine is not being spun by exhaust flow, it provides no assisting rotation to the compressor. Instead, the compressor acts merely as a restriction to intake airflow into the engine. This condition causes a restriction at the compressor and hence negative work and a pressure drop across it. The techniques of the instant disclosure model this compressor drop and alter other actuators in the system to compensate for it during operation in the CLOC mode.

Figure 1:
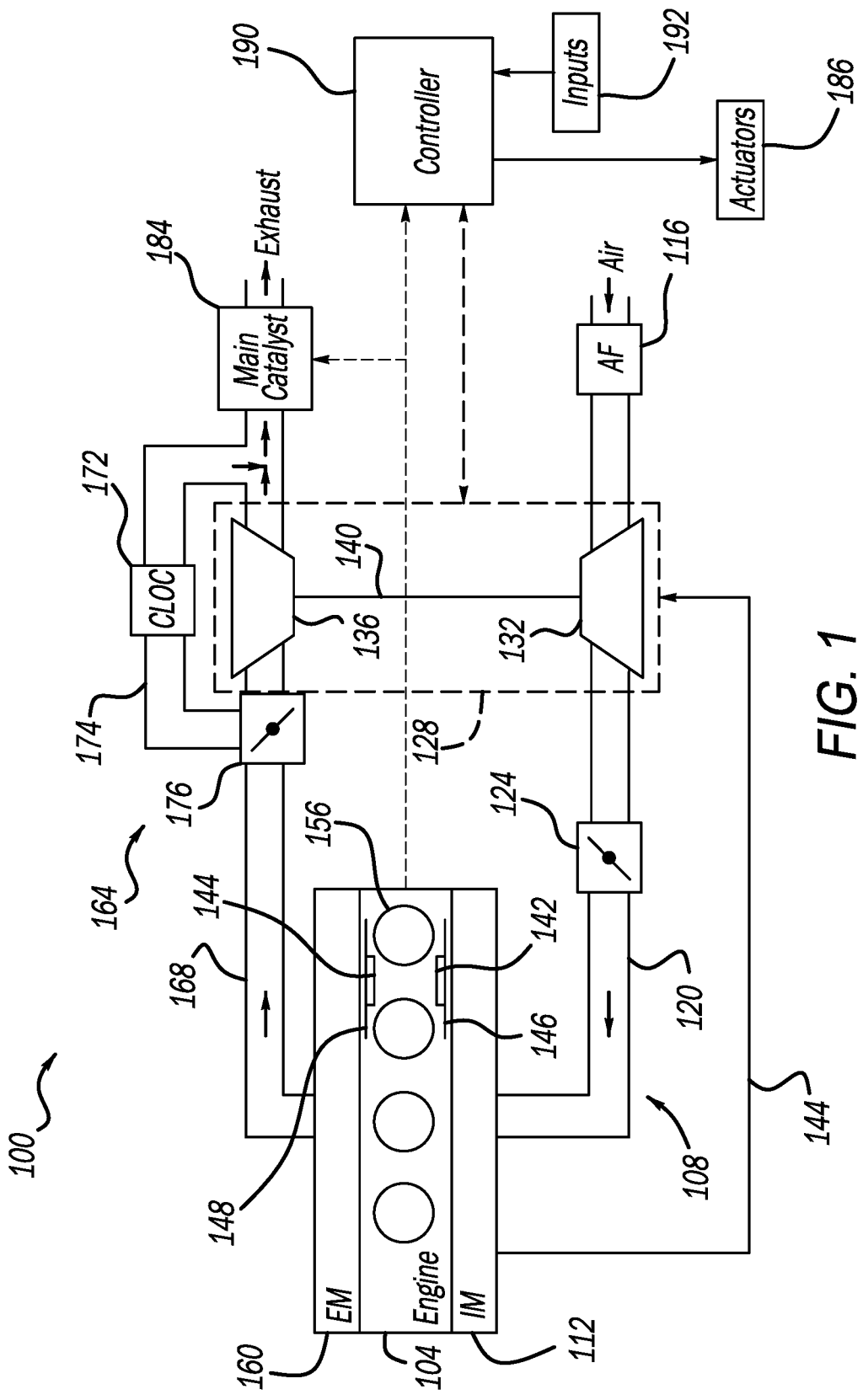
FIG. 1 is a diagram of an example vehicle comprising a turbocharged engine incorporating a cold light off catalyst (CLOC) and CLOC valve according to the principles of the present disclosure.

Referring now to FIG. 1, a diagram of an example vehicle or vehicle control system 100 is illustrated. The vehicle 100 includes an engine 104 configured to combust an air/fuel mixture to generate drive torque. The engine 104 includes an intake system 108 that draws fresh air into an intake manifold (IM) 112 through an air filter (AF) 116 and an induction passage 120. A throttle valve 124 regulates a flow of air through the induction passage 120. A turbocharger 128 comprises a compressor 132 (e.g., a centrifugal compressor) that pressurizes or forces the air through the induction passage 120. The compressor 132 is coupled to a turbine 136 (e.g., a twin-scroll turbine) of the turbocharger 136 via a shaft 140.

The engine 104 includes a valve train assembly having a series of intake rocker arm valve assemblies 142 and a series of exhaust rocker arm valve assemblies 144. An intake camshaft 146 can be operably associated with the intake rocker arm valve assemblies 142, and an exhaust camshaft 148 can be operably associated with the exhaust rocker arm valve assemblies 144. The intake and exhaust camshafts 146, 148 have respective cam assemblies thereon that, when rotated control the opening and closing of the respective intake and exhaust rocker arm valve assemblies 142, 144. It is appreciated that the intake and exhaust rocker arm valve assemblies 142, 144 and related camshafts 146, 148 are illustrated in FIG. 1 merely for identification purposes and not shown to scale or location relative to the engine 104.

The pressurized air is distributed to a plurality of cylinders 156 and combined with fuel (e.g., from respective direct-injection or port-injection fuel injectors) to form an air/fuel mixture. While four cylinders are shown, it will be appreciated that the engine 104 could include any number of cylinders. The air/fuel mixture is compressed by pistons (not shown) within the cylinders 156 and combusted (e.g., via spark from respective spark plugs) to drive the pistons, which turn a crankshaft (not shown) to generate drive torque. The drive torque is then transferred to a driveline (not shown) of the vehicle 100, e.g., via a transmission (not shown). Exhaust gas resulting from combustion is expelled from the cylinders 156 and into an exhaust manifold (EM) 160 of the engine 104.

The exhaust gas from the exhaust manifold 160 is provided to an exhaust system 164 comprising an exhaust passage 168. Kinetic energy of the exhaust gas drives the turbine 136, which in turn drives the compressor 132 via the shaft 140. A cold light off catalyst (CLOC) 172 is routed in a bypass passage 174 around the turbine 136. A CLOC valve 176 selectively controls exhaust flow into the turbine 136 of the turbocharger 128 and/or into the CLOC 172 via the bypass passage 174.

Explained further, the CLOC valve 176 moves between a fully open position whereby all exhaust gas is routed to the turbine 136, a fully closed position whereby all exhaust gas is routed to the CLOC 172, and infinite positions therebetween causing a blend of exhaust to be routed to both of the turbine 136 and the CLOC 172. As used herein a "CLOC mode" is used to refer to the controller 190 commanding the CLOC valve 176 to rout at least some exhaust to the CLOC 172. A main exhaust gas treatment system 184, such as a catalytic converter, treats exhaust gas to decrease or eliminate emissions before it is released into the atmosphere. All exhaust gas regardless of passing through the turbine 136 or the CLOC 172 is directed to the main exhaust gas treatment system 184. The CLOC 172 includes a small catalyst that can reach high efficiency quickly and treat the exhaust gas such as when the main catalyst 184 has yet to reach optimal operating temperature.

Lubrication oil from the engine 104 is routed through an oil line 144 to the turbocharger 128 to lubricate components of the turbocharger 128. In examples, the oil is sourced from the engine 104 at the sump.

A controller, also referred to herein as an engine controller, 190 controls operation of the vehicle 100. Examples of components controlled by the controller 190 include the engine 104, the throttle valve 124, the CLOC valve 176 and actuators, collectively identified at 186. It will be appreciated that the controller 190 controls specific components of the vehicle 100 that are not illustrated, such as, but not limited to, fuel injectors, spark plugs, an EGR valve, a VVC system (e.g., intake/exhaust valve lift/actuation), a transmission, and the like. The controller 220 controls operation of these various components based on measured and/or modeled parameters.

Inputs 192 such as one or more sensors are configured to measure one or more parameters, and communicate signals indicative thereof to the controller 190 (pressures, temperatures, speeds, etc.) as discussed in greater detail herein. Other parameters could be modeled by the controller 190, e.g., based on other measured parameters. The controller 190 is also configured to perform the engine/turbocharger control techniques.

Figure 2:
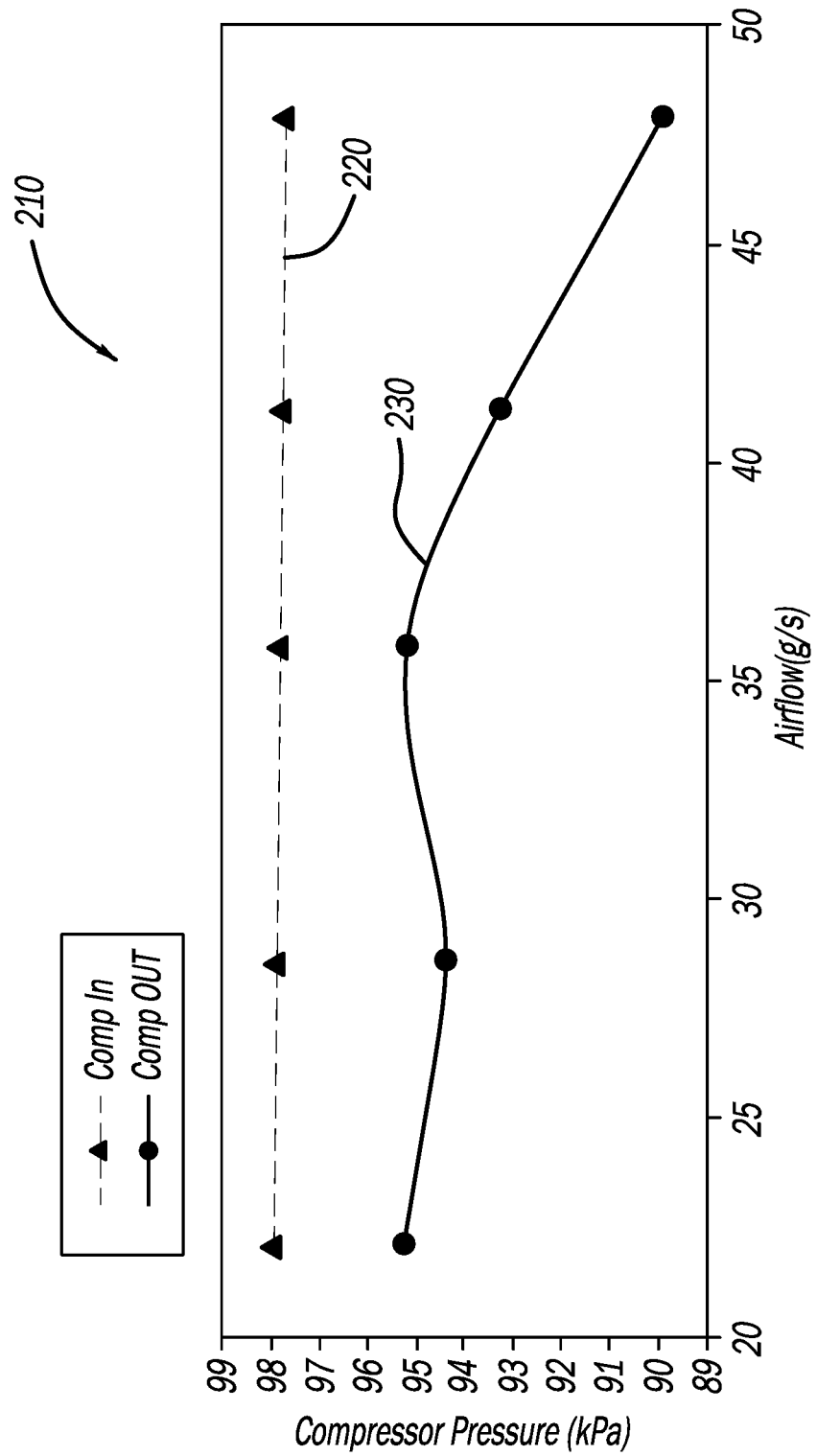
FIG. 2 is a graph illustrating airflow versus compressor pressure according to the principles of the present disclosure.

With additional reference now to FIG. 2, During operation of the CLOC 172, and specifically when the CLOC valve 176 is fully closed, there is zero exhaust flow contributing to the spinning of the turbine 136 (and therefore the compressor 132). However, the turbocharger shaft 140 is still spinning due to the compressor 132, airflow requirement from the engine 104. This condition causes a restriction or blockage at the compressor 132 and hence negative work and a pressure drop across it. The techniques described herein mitigate this negative work condition during CLOC operation to allow an acceptable airflow into the engine 104.

With reference to FIG. 2, exemplary airflow versus compressor pressure is shown. As indicated, a compressor "in" pressure 220 substantially tracks atmospheric pressure while a compressor "out" pressure 230 substantially reduces indicating a pressure drop or vacuum condition while in CLOC mode. Pressure "in" and "out" can be modelled based on operating positions. In other examples pressure "in" and "out" can be measured by sensors that provide inputs 192.

Figure 3:
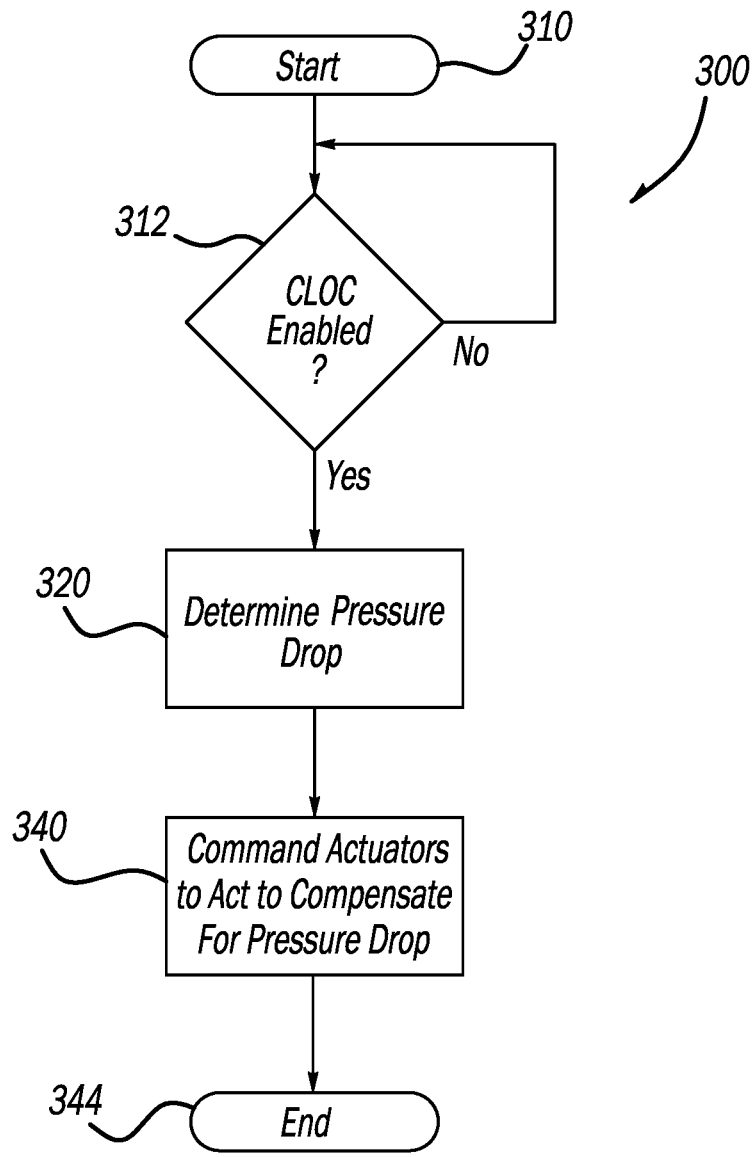
FIG. 3 is a flow diagram of an example method of operating the CLOC valve of the turbocharged engine according to the principles of the present disclosure.

Referring now to FIG. 3, a flow chart of an example method 300 of operating the engine 104 having the turbocharger 128, CLOC 172, CLOC valve 176 and actuators 186 is illustrated. For explanatory purposes, components of the vehicle 100 will be referenced, but it will be appreciated that this method 300 could be used for any engine having a turbocharger and CLOC. Control starts at 310. At 312, the controller 190 determines whether CLOC is enabled. Again, CLOC operation can be enabled such as at startup of the engine 104 when the main catalyst 184 has not reached optimal operating temperature. At 320 control determines a pressure or pressure drop (e.g., pressure over time) within the turbocharger 128.

In examples, the controller 190 can receive a pressure measurement within the turbocharger 128 from the inputs 192, such as from a pressure sensor or pressure sensors configured upstream and downstream of the compressor 132 on the turbocharger 128. In other examples, the pressure can be estimated based on models (see FIG. 2) and other operating conditions.

At 340 control commands the actuators 186 to act to compensate for the pressure drop. In examples, the actuators 186 can include commanding the CLOC valve 176 to open a predetermined amount to relieve the pressure drop (and return to near atmospheric pressure within the turbocharger 128). In examples, the predetermined amount can be less than 5% open such as 1%. The CLOC valve 176 can be moved to other degrees of open beyond 5% within the scope of this disclosure.

In other examples, commanding the actuators 186 can additionally or alternatively include opening the throttle valve 124 more through the induction passage 120 to allow more airflow into the engine 104. In additional examples, commanding the actuators 186 can additionally or alternatively include altering the opening and closing of intake and exhaust rocker arm valve assemblies 142, 144 to allow increased airflow into the engine 104. Commanding the actuators 186 can additionally or alternatively include other actions found to increase airflow into the engine despite operation in CLOC mode. Control ends at 344.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine comprising a turbocharger, the system comprising:
   a throttle valve that regulates flow of air into the engine;
   a cold light off catalyst (CLOC) positioned in a bypass passage around a turbine of the turbocharger;
   a CLOC valve that selectively routes exhaust flow from the engine between the turbine and the CLOC; and
   a controller configured to:
      command the CLOC valve to a first position whereby exhaust flow is routed, at least partially, to the CLOC in a CLOC mode;
      determine, based on operation in the CLOC mode, a pressure drop within the turbocharger; and
      command an actuator to move resulting in increased airflow into the engine while in the CLOC mode.

2. The control system of claim 1, wherein commanding the CLOC valve to the first position comprises commanding the CLOC valve to a position wherein all exhaust flow is directed to the CLOC.

3. The control system of claim 2, wherein commanding the actuator comprises:
   commanding the CLOC valve from the first position to an open position based on determining the pressure drop within the turbocharger.

4. The control system of claim 3, wherein determining the pressure drop within the turbocharger is indicative of a vacuum condition within the turbocharger.

5. The control system of claim 4, wherein the open position comprises a position corresponding to less than 5% open.

6. The control system of claim 2, wherein commanding the actuator comprises:
   commanding the throttle valve to open a predetermined amount to allow increased airflow into the engine.

7. The control system of claim 2, further comprising:
   intake and exhaust valves that control airflow into and out of the engine, wherein commanding the actuator comprises:
   altering the opening and closing of one of the intake and exhaust valves to allow increased airflow into the engine.

8. The control system of claim 1, wherein determining the pressure drop within the turbocharger comprises receiving a signal from a pressure sensor indicative of the pressure of the turbocharger.

9. The control system of claim 1, wherein determining the pressure within the turbocharger comprises modeling the pressure drop of the turbocharger based on operating conditions.

10. A method for controlling an engine comprising a turbocharger, the method comprising:
    commanding operation of a cold light off catalyst (CLOC) positioned in a bypass passage around a turbine of the turbocharger, the commanding including commanding a CLOC valve to a first position whereby exhaust flow is routed, at least partially, to the CLOC in a CLOC mode;
    determining, based on operation in the CLOC mode, a pressure drop within the turbocharger; and
    commanding an actuator to move resulting in increased airflow into the engine while in the CLOC mode.

11. The method of claim 10, wherein commanding the CLOC valve to the first position comprises commanding the CLOC valve to a position wherein all exhaust flow is directed to the CLOC.

12. The method of claim 10, wherein commanding the actuator comprises:
    commanding the CLOC valve from the first position to an open position based on determining the pressure drop within the turbocharger.

13. The method of claim 12, wherein determining the pressure drop within the turbocharger is indicative of a vacuum condition within the turbocharger.

14. The method of claim 13, wherein the open position comprises a position corresponding to less than 5% open.

15. The method of claim 10, wherein commanding the actuator comprises:
   commanding the throttle valve to open a predetermined amount to allow increased airflow into the engine.

16. The method of claim 10, wherein the engine includes intake and exhaust valves that control airflow into and out of the engine, wherein commanding the actuator comprises:
   altering the opening and closing of one of the intake and exhaust valves to allow increased airflow into the engine.

17. The method of claim 10, wherein determining the pressure drop within the turbocharger comprises receiving a signal from a pressure sensor indicative of the pressure of the turbocharger.

18. The method of claim 1, wherein determining the pressure within the turbocharger comprises modeling the pressure drop of the turbocharger based on operating conditions.

\* \* \* \* \*